United States Patent
Mulder

(10) Patent No.: US 8,837,922 B2
(45) Date of Patent: *Sep. 16, 2014

(54) IN-LINE DUCT SUPPLEMENTAL HEATING AND COOLING DEVICE AND METHOD

(71) Applicant: TPI Corporation, Gray, TN (US)

(72) Inventor: Eric P. Mulder, Caledonia, MI (US)

(73) Assignee: TPI Corporation, Gray, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/058,849

(22) Filed: Oct. 21, 2013

(65) Prior Publication Data

US 2014/0041849 A1    Feb. 13, 2014

Related U.S. Application Data

(60) Continuation of application No. 13/646,963, filed on Oct. 8, 2012, now Pat. No. 8,625,976, which is a division of application No. 12/201,101, filed on Aug. 29, 2008, now Pat. No. 8,285,127.

(60) Provisional application No. 60/970,102, filed on Sep. 5, 2007.

(51) Int. Cl.

| | | |
|---|---|---|
| F24D 13/00 | (2006.01) |
| F24F 11/053 | (2006.01) |
| F24H 3/04 | (2006.01) |
| F24D 13/04 | (2006.01) |
| G05D 23/19 | (2006.01) |
| F24D 19/10 | (2006.01) |
| F24H 9/20 | (2006.01) |
| F24F 11/04 | (2006.01) |
| F24D 5/02 | (2006.01) |
| F24F 1/00 | (2011.01) |
| F24F 11/00 | (2006.01) |

(52) U.S. Cl.
CPC .......... *F24D 19/1096* (2013.01); *F24F 11/053* (2013.01); *F24H 3/0411* (2013.01); *F24D 13/04* (2013.01); *G05D 23/1902* (2013.01); *F24H 9/2071* (2013.01); *F24D 19/1084* (2013.01); *F24F 11/0012* (2013.01); *F24F 11/04* (2013.01); *F24D 5/02* (2013.01); *F24F 1/0007* (2013.01)
USPC ............................ 392/347; 392/360; 454/229

(58) Field of Classification Search
None
See application file for complete search history.

(56) References Cited

U.S. PATENT DOCUMENTS

| | | |
|---|---|---|
| RE14,563 E | 12/1918 | Braly |
| 3,025,382 A | 3/1962 | Eisele |

(Continued)

OTHER PUBLICATIONS

AlerG Website entitled "Suncourt Inductor In Line Duct Fan—6 in." published on or before Dec. 10, 2006, available at http://www.alerg.com/page/A/PROD/AIR6AF8046.

(Continued)

*Primary Examiner* — Thor Campbell
(74) *Attorney, Agent, or Firm* — Gardner, Linn, Burkhart & Flory, LLP

(57) ABSTRACT

A method of heating or cooling a room of a building includes providing supplemental warmer or cooler air to the room with an inline duct supplemental heating and cooling device mounted along an air duct that supplies the room with air from a main furnace and/or cooling unit associated with the building. A thermostat is used to set a desired temperature for the room, and a controller of the supplemental heating and cooling device is in communication with the thermostat, and activates an electric heater and/or fan as appropriate to warm or cool the room as needed. When the device is used to cool the room, the fan may be operated to draw cooled air through the duct from the main cooling unit and/or from other areas in the building that are linked via ductwork.

20 Claims, 10 Drawing Sheets

(56) References Cited

U.S. PATENT DOCUMENTS

| | | |
|---|---|---|
| 3,111,571 A | 11/1963 | De Camp |
| 3,173,478 A | 3/1965 | Maycen |
| 3,620,644 A | 11/1971 | McLarty |
| 3,631,525 A | 12/1971 | Brasch |
| 3,674,203 A | 7/1972 | McGrath |
| 3,737,622 A | 6/1973 | Hallgreen |
| 3,773,285 A | 11/1973 | Morrill |
| 3,794,810 A | 2/1974 | Brasch et al. |
| 3,934,064 A | 1/1976 | Lowthian |
| 3,935,855 A | 2/1976 | van Vliet |
| 4,175,699 A | 11/1979 | Engeling et al. |
| 4,196,755 A | 4/1980 | Kutnyak et al. |
| 4,278,423 A | 7/1981 | Siccardi |
| 4,289,955 A | 9/1981 | Seeley |
| 4,347,712 A | 9/1982 | Benton et al. |
| 4,369,765 A | 1/1983 | McDaniel |
| 4,427,055 A | 1/1984 | Heavener |
| 4,570,448 A | 2/1986 | Smith |
| 4,605,160 A | 8/1986 | Day |
| 4,642,441 A | 2/1987 | Kenyon |
| 4,662,268 A | 5/1987 | Beavers |
| 4,716,957 A | 1/1988 | Thompson et al. |
| 4,821,700 A | 4/1989 | Weibler et al. |
| 4,950,871 A | 8/1990 | Pollak et al. |
| 4,997,342 A | 3/1991 | Conger, IV |
| 5,080,403 A | 1/1992 | Paoluccio |
| 5,271,558 A | 12/1993 | Hampton |
| 5,275,012 A | 1/1994 | Dage et al. |
| 5,860,858 A | 1/1999 | Wettergren |
| 5,948,509 A | 9/1999 | Felson |
| 6,169,850 B1 | 1/2001 | Menassa |
| 6,364,211 B1 | 4/2002 | Saleh |
| 6,655,833 B1 | 12/2003 | Melin |
| 7,059,536 B2 | 6/2006 | Schneider et al. |
| 7,119,308 B2 | 10/2006 | Kopel |
| 7,177,534 B2 | 2/2007 | Jones et al. |
| 7,203,416 B2 | 4/2007 | Craw et al. |
| 7,296,426 B2 | 11/2007 | Butler et al. |
| 7,431,641 B2 | 10/2008 | Darling |
| 7,558,648 B2 | 7/2009 | Hoglund et al. |
| 2004/0013526 A1 | 1/2004 | Nilson |
| 2004/0135439 A1 | 7/2004 | White |
| 2005/0092888 A1 | 5/2005 | Gonce |
| 2007/0012052 A1 | 1/2007 | Butler et al. |
| 2007/0119961 A1 | 5/2007 | Kaiser |
| 2008/0000617 A1 | 1/2008 | Cortina-Cordero |
| 2009/0056929 A1 | 3/2009 | Mulder |
| 2013/0032308 A1 | 2/2013 | Mulder |

OTHER PUBLICATIONS

Carrier Rental Systems Website entitled "Carrier Rental Systems: 60kW In-Line Heaters" published on or before Dec. 10, 2006, located at http://ww.hvacportablesystems.com/60kwhtr.htm.

Grainger Industrial Supply Website for "Heater Finned Duct" published on or before Dec. 10, 2006, available at http:/www.grainer.com/Grainger/items/3HV05.

Grainger Industrial Supply Website for "Floor Heater, 120V, 750/1500 W", published on or before Dec. 10, 2006, available at http://www.grainer.com/Grainger/items2YU86.

Grainger Industrial Supply Website for "Kickspace Heater, 120V, 750/1500W", published on or before Dec. 10, 2006, available at http://www.grainger.com/Grainger/items/2YV10.

"Application Considerations", document No. VAV-PRC005-EN, believed to have been published by Price Industries before Sep. 5, 2006.

"Fan Powered System Applications", believed to have been published by Redd-i Inc. before Sep. 5, 2006.

Brochure entitled "In Line Duct Heater", published on or before Dec. 10, 2006, by Nutech Brands, Inc.

RS Components Ltd. Website entitled "Duct heater w/thermal cutout, 150 mm 1.5kW" published on or before Dec. 10, 2006, located at http://rswww.com.

Statement regarding activities by inventor E. Mulder that are believed to have occurred on or about May 2006.

Commonly owned U.S. Appl. No. 14/058,860, filed Oct. 21, 2013.

IN-LINE DUCT SUPPLEMENTAL HEATING AND COOLING DEVICE AND METHOD

CROSS REFERENCE TO RELATED APPLICATIONS

This application is a continuation of U.S. patent application Ser. No. 13/646,963, filed Oct. 8, 2012, now U.S. Pat. No. 8,625,976, which is a division of U.S. patent application Ser. No. 12/201,101, filed Aug. 29, 2008, now U.S. Pat. No. 8,285,127, which claims the benefit of U.S. provisional application, Ser. No. 60/970,102, filed Sep. 5, 2007, all of which are hereby incorporated herein by reference in their entireties.

FIELD OF THE INVENTION

The present invention relates generally to supplemental heating and cooling devices, especially for forced air heating systems in buildings.

BACKGROUND OF THE INVENTION

It is known to provide auxiliary or supplemental heating devices in rooms that tend to be cooler than the rest of a home or building, or in rooms in which a higher temperature is desired. Such supplemental heaters may be placed directly in the room or may be positioned in an air duct that is adapted to supply heat from the home's standard or traditional furnace to the room.

However, some of these types of devices must be manually activated and deactivated. Even if such a device is adapted to be activated automatically, the components of the device, such as a heater or a fan, etc., are typically not adapted to be activated and deactivated individually. Further, these types of devices are not adapted to also assist in cooling the room when the temperature in the room is warmer than desired. Additionally, with respect to devices adapted to be mounted in an air duct, several safety issues and fire hazards can arise, such as overheating of the air in the duct or of the heating device itself.

SUMMARY OF THE INVENTION

The embodiments of the present invention provide an electric heating and cooling device adapted to supplement a standard or traditional furnace or cooling system that supplies heated or cooled air to a room through at least one air duct extending therefrom. The heating and cooling device is adapted to be at least partially mounted in the air duct and includes an electric heater, a fan adapted to blow air through the duct, and a housing for containing the electric heater and fan. The heating and cooling device also includes a thermostat for selecting a desired temperature in the room and detecting a temperature in the room. A control is electrically connected to the thermostat and to the electric heater and fan for activating and deactivating the electric heater and fan based on input from the thermostat. The control automatically activates the electric heater when a temperature detected in the room is lower than the desired temperature. Further, the control automatically activates the fan when the temperature detected in the room is higher or lower than the desired temperature.

The heating and cooling device also includes a discharge air temperature sensor adapted to deactivate the electric heater when the temperature of air being discharged from the air duct is higher than a selectively chosen limit temperature, which may be approximately 70 degrees Celsius. Additionally, a safety temperature limit switch is included to deactivate the electric heater when the temperature of the electric heater is higher than a selectively chosen limit temperature, which may be approximately 111 degrees Celsius. The safety temperature limit switch is automatically reset to allow activation of the electric heater when the electric heater cools to a temperature below the limit temperature.

Optionally, the control deactivates the electric heater and fan when the temperature detected by the thermostat in the room is higher than or equal to the desired temperature. The control may also deactivate the fan when the temperature detected in the room by the thermostat is equal to the desired temperature.

In addition to the discharge air temperature sensor and safety temperature limit switch, and in the case that these two safety devices fail to prevent overheating of the device, the heating and cooling device may include a fusible link, or thermal cut out, which physically breaks or otherwise interrupts the electric current from or between the control to the electric heater and the fan when the temperature of the electric heating and cooling device exceeds a selectively chosen limit temperature, which may be approximately 1 to 5 degrees Celsius higher than that of the safety temperature limit switch, such as, for example, 113 degrees Celsius. The heating and cooling device is not operable when the fusible link is broken. Optionally, an automatically resettable temperature limit control detects radiant and/or convective heat from the heater, and may be used in place of the safety temperature limit switch and fusible link. The automatically resettable temperature limit control deactivates the electric heater when the temperature at the limit control is higher than a selectively chosen limit temperature, which may be approximately 65 degrees Celsius.

Optionally, the control may comprise an electrical circuit on a circuit board. A conduit may be attached or mounted to the housing of the device for containing wiring adapted to electrically connect the electric heater and the fan to the control or circuit board.

Optionally, the heating and cooling device may be connected to the air duct via a vibration insulator sleeve that includes a cylindrical hollow fabric member for absorbing sound and vibration from the device. The vibration insulator sleeve includes a coated fabric, such as vinyl or fiberglass fabric coated with silicone, polychloroprene, or chlorosulfonated polyethylene, that is looped and heat-sealed to form the cylindrical hollow fabric member. The sleeve may be flexible and axially collapsible to facilitate installation of the sleeve and the heating and cooling device in a gap in an air duct.

According to another embodiment of the invention, a method of heating and cooling a room is provided. The room is primarily heated by a furnace that is adapted to supply heated air to the room through at least one air duct. The method includes mounting an electric heating and cooling device in the at least one air duct, the electric heating and cooling device including an electric heater, a fan, and a housing for containing or supporting the electric heater and fan. The method further includes selectively adjusting a thermostat, which is electrically connected to or in communication with the heating and cooling device, to a temperature desired in the room, and detecting a temperature in the room. The electric heater and fan are automatically activated when the desired temperature is higher than the temperature detected in the room. The fan is also automatically activated when the desired temperature is lower than the temperature detected in the room to blow cool air, or air that is at a temperature lower than the air in the room, through the air duct into the room.

Further, the method may include deactivating the electric heater when the desired temperature sensed by the thermostat is lower than or equal to the temperature detected in the room and deactivating the fan when the desired temperature is equal to the temperature detected in the room.

Optionally, a discharge air temperature sensor may deactivate the electric heater when a temperature of air discharged from the air duct is higher than a selectively chosen limit temperature, which may be approximately 70 degrees Celsius.

Further, a safety temperature limit switch may deactivate the electric heater when a temperature of the electric heater exceeds a selectively chosen limit temperature, which may be approximately 111 degrees Celsius. The safety temperature limit switch automatically resets to allow the electric heater to operate when the electric heater cools to a temperature below the limit temperature.

Optionally, the method may include breaking a fusible link to interrupt the electric current from a control adapted for activating and deactivating the electric heater and the fan. The fusible link is automatically broken when the electric heating and cooling device exceeds a selectively chosen limit temperature, which may be approximately 113 degrees Celsius. The electric heating and cooling device is prevented from operating after the fusible link is broken, such that the fusible link must be replaced to allow the electric heating and cooling device to operate.

Thus, the inline duct supplemental heating and cooling device of the present invention provides heated and/or cooled air, and/or air at a temperature lower than that in the room to a room in a building that is typically cooler or warmer than the remaining rooms in the building. For example, the device provides supplemental heated air to rooms that are a great distance or remote from the furnace positioned at the end of the heating duct, or to rooms that are larger or contain a number of windows and are, therefore, more difficult to heat. Further, the electric heater and fan are adapted to be activated and deactivated individually, such that the device is adapted to operate in "fan only" mode to increase air circulation to assist in cooling the room when the temperature in the room is warmer than desired. Because the device is adapted to use the existing duct work of a building, additional ducts are not required. In addition, the device may include three levels of protection, i.e., three separate safety devices, to prevent overheating of heater air or the device itself, even in the case of circuit board failure. The device may be mounted to an existing air duct via a vibration insulator sleeve that is flexible and collapsible, and which absorbs sound and vibration from the device to provide quiet operation and facilitate installation.

These and other objects, advantages, purposes and features of the present invention will become apparent upon review of the following specification in conjunction with the drawings.

DESCRIPTION OF THE PREFERRED EMBODIMENTS

Figure 1:
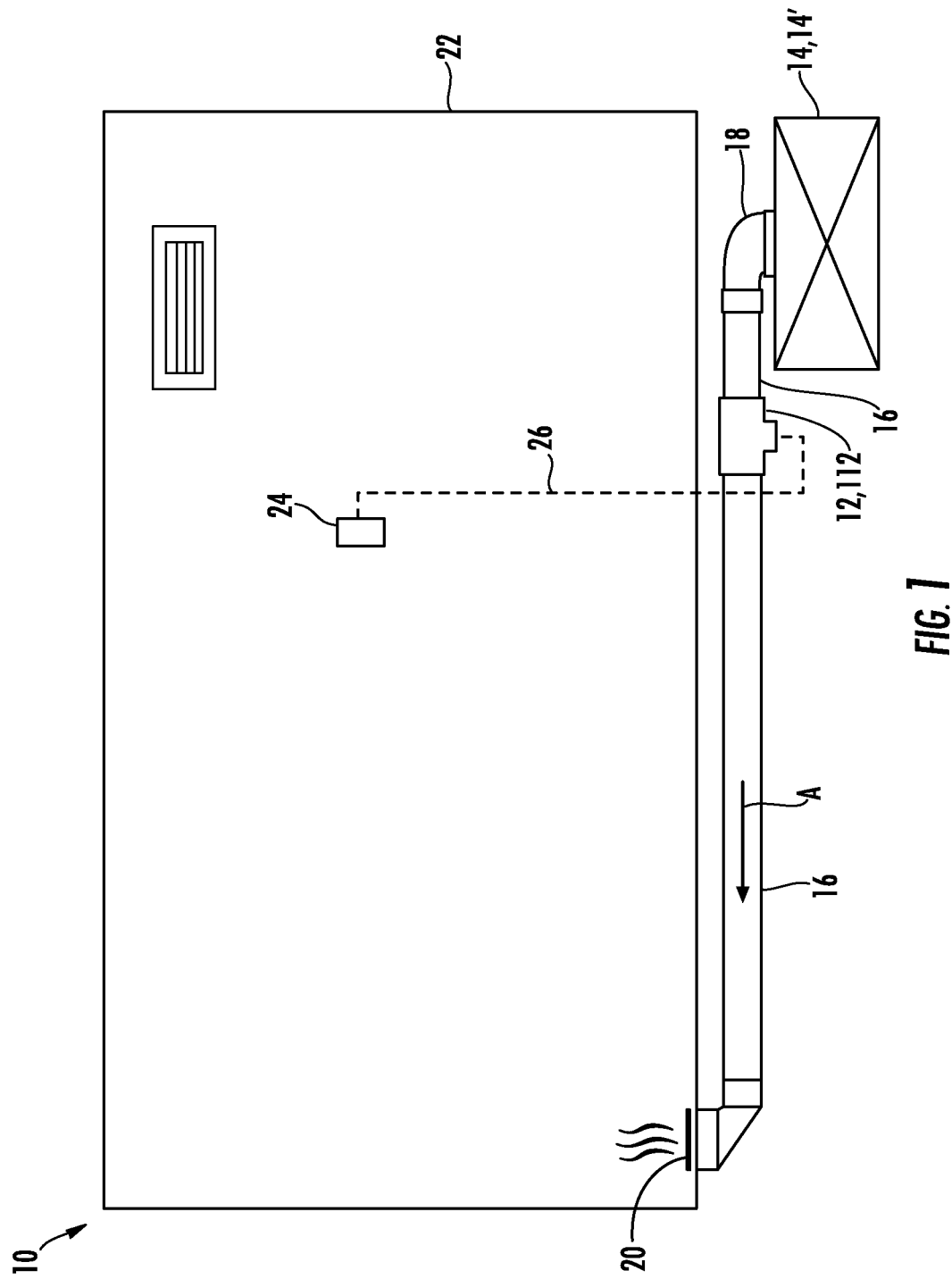
FIG. 1 is a schematic view of a system of heating and cooling a room, including a heating and cooling device according to the present invention.

Referring now to the drawings and the embodiments illustrated therein, a system 10 for heating and cooling or conditioning a space, such as a room in a home or other building, includes an electric heating and cooling device 12 adapted to supplement a traditional or standard furnace 14 or air conditioner 14' (FIG. 1). Heating and cooling device 12 is adapted to be at least partially mounted in an air duct, such as air duct 16 of a forced air duct system, which extends from furnace 14 or a cooling unit 14' for transferring heated or cooled air to a room 22. Device 12 is especially useful for rooms that may be remote from furnace 14 (or an air conditioning unit 14' that may be connected to and use duct system 16) at or near the end of duct system 16, where heating and/or cooling is/are less efficient than for rooms closer to furnace 14 and/or cooling unit 14'. Device 12 may also be useful for rooms that are large or that have a number of windows, which may make such rooms difficult to heat and/or cool.

Figure 2:
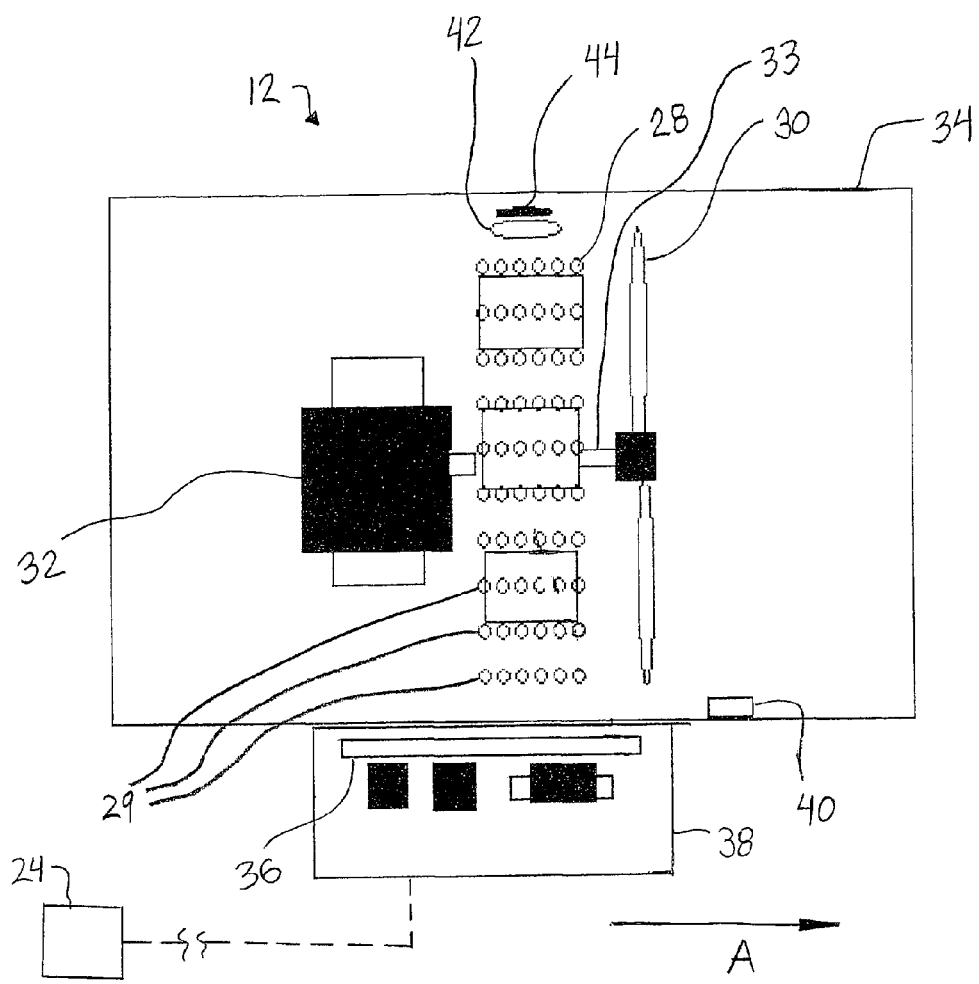
FIG. 2 is a side elevation of the heating and cooling device of FIG. 1.

As shown in FIG. 2, heating and cooling device 12 includes an electric heater assembly or heater 28 having a plurality of resistance type heating devices 29 and a fan 30 adapted to blow heated or cooled air from furnace 14 or cooling unit 14' through duct 16. Device 12 also includes a housing 34 that contains or supports heater 28 and fan 30 therein. A thermostat 24 (FIGS. 1, 2, and 4) is provided for selecting a desired temperature in room 22 and detecting a temperature in room 22 and is connected to a control 36 for device 12, as explained more fully below. Control 36 is electrically connected to thermostat 24 via a wire 26 or via a wireless connection, and to heater 28 and fan 30, for activating and deactivating one or more of heater 28 and fan 30 based on input from thermostat 24. For example, when the actual or current temperature detected in room 22 by thermostat 24 is lower than the desired temperature set on thermostat 24, control 36 automatically activates heater 28 and fan 30, to blow heated air from both furnace 14 and heater 28 through duct 16 into room 22. Control 36 also automatically activates fan 30 when the temperature detected in room 22 is higher than the desired temperature set on thermostat 24, i.e., when heater 28 is not activated, such that fan 30 blows air through duct 16 to ventilate and cool room 22, especially when system 10 includes an air conditioning unit 14'.

Heating and cooling device 12 also includes safety devices to prevent overheating of both heater 28 and the air in duct 16. Specifically, a discharge air temperature sensor 40 positioned in duct 16 downstream from fan 30 is connected to control 36 and is adapted to deactivate heater 28 when the temperature of air being discharged from duct 16 is higher than a selectively chosen limit temperature, which may be set in the range of approximately 70 degrees Celsius. Discharge air temperature sensor 40 may be of the type sold under part number F1107025ACFA06E by Cantherm, having a place of business at 8415 Mountain Sights Avenue, Montreal (Quebec), H4P 2B8 Canada (http://www.cantherm.com). Heating and cooling device 12 also includes a temperature limit control or safety temperature limit switch 42 adapted to deactivate heater 28 when the temperature immediately adjacent heater 28 reaches a certain temperature that is selectively chosen as a limit temperature, which may be set in the range of approximately 111 degrees Celsius. Safety temperature limit switch 42 is adapted to automatically reset when the temperature immediately adjacent heater 28 cools to a temperature below the limit temperature, to allow or resume operation of heater 28. Thus, safety temperature limit switch 42 is not required to be manually reset or replaced once it has been activated. Limit switch 42 may be of the type sold by Holmes, Inc., having a place of business at 1605 George Dieter #688, El Paso, Tex. 79936 (http://www.holmesproducts.com).

Figure 4:
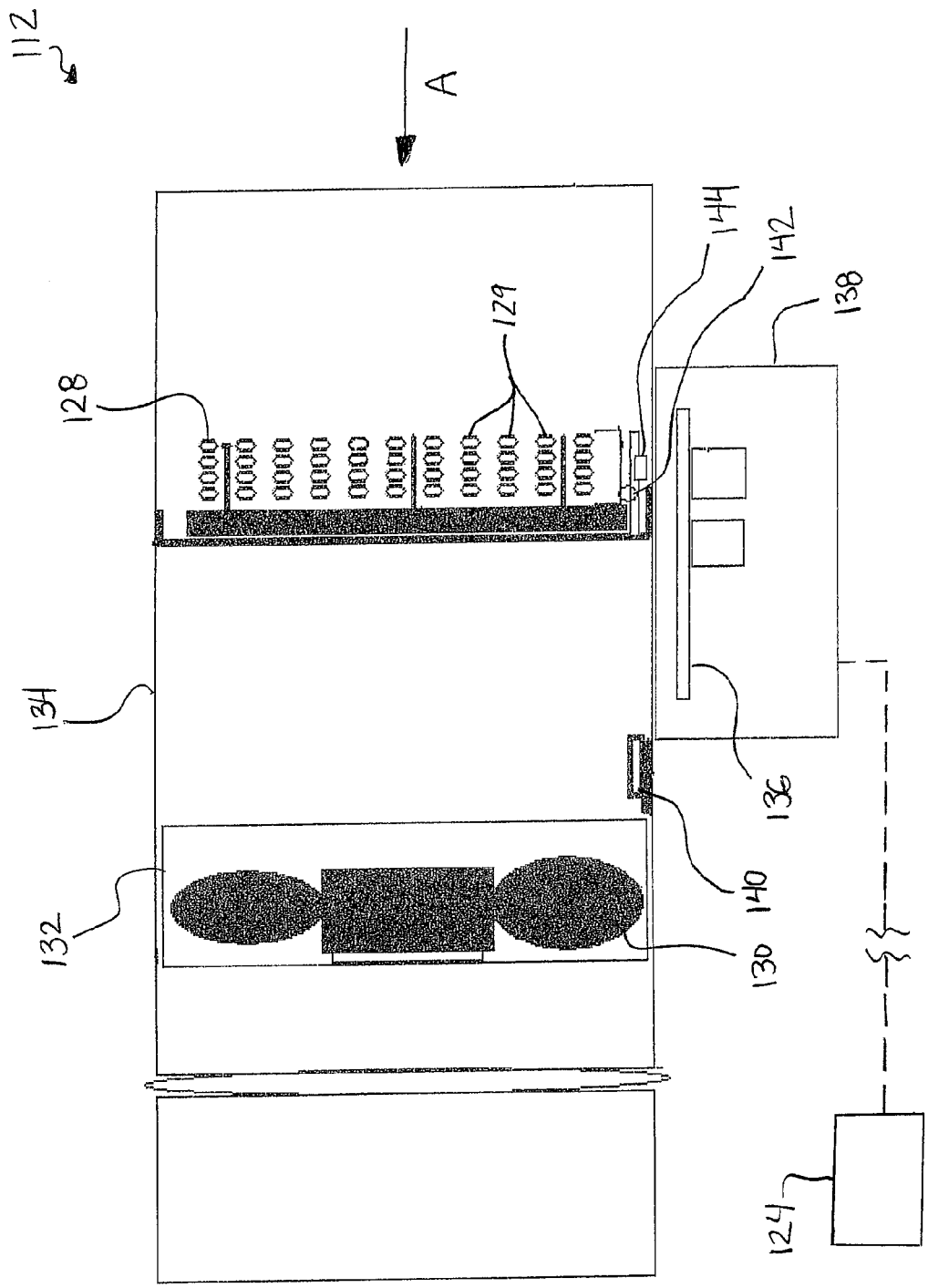
FIG. 4 is a is a side elevation of another heating and cooling device according to the present invention.

Housing 34 may be formed from galvanized sheet metal, polyvinyl coated ductwork or other similar material and may be formed in any suitable shape adapted to contain heater 28 and fan 30. Housing 34 is preferably adapted to be mounted in a standard air duct, such as a standard six inch, seven inch, or eight inch round, metal supply duct. For example, housing 34 may be formed from six inch polyvinyl coated ductwork (PCD) spiral pipe, or from any other material adapted to withstand heat from heater 28. In the illustrated embodiment, housing 34 is generally cylindrical and hollow, and contains open ends, such that housing 34 is adapted to allow air to flow therethrough. For example, as shown in FIG. 1, heated air flowing from furnace 14 flows through a connection corner duct 18 into duct 16, and through housing 34 of heating and cooling device 12, and continues to flow through duct 16 in a direction A toward supply register 20 in room 22. Housing 34 is mounted in duct 16 such that air flows in direction A first toward heater 28 and then into fan 30 and toward supply register 20 (FIGS. 2 and 4).

Heater 28 of heating and cooling device 12 may be any suitable heating device adapted to be mounted or at least partially positioned or contained in housing 34. For example, heater 28 may be a selectable 500, 1000, or 1500 watt open coil, resistance type, electric heating device or assembly, which are known in the art and which may be supplied by Holmes, Inc., having a place of business at 1605 George Dieter #688, El Paso, Tex. 79936 (http://www.holmesproducts.com). Heater 28 may be a standard heating device or may be customized for optimal performance in heating and cooling device 12.

Figure 6:
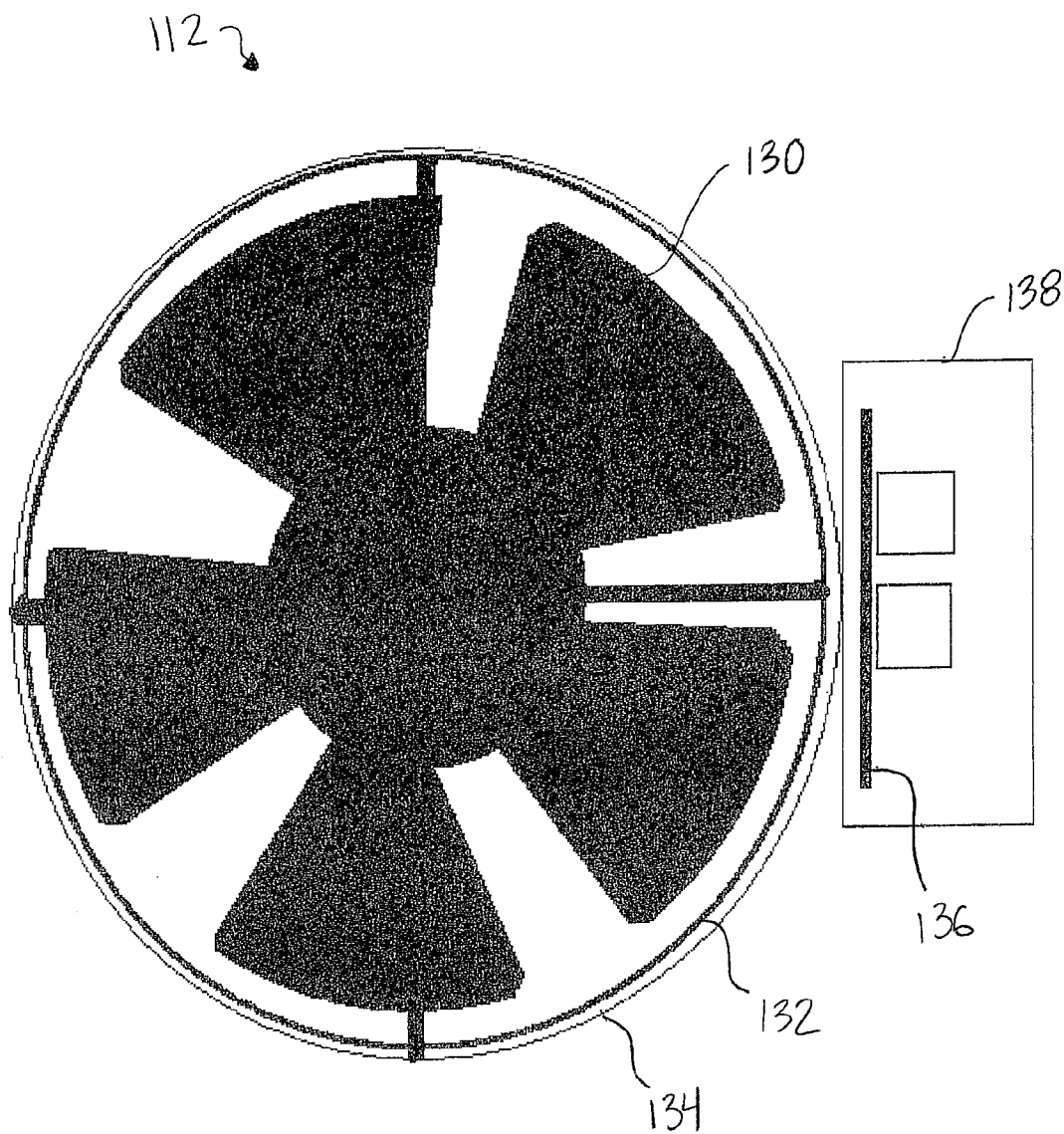
FIG. 6 is a rear elevation of the heating and cooling device of FIGS. 4 and 5.

Fan 30 may be any suitable fan adapted to blow air through duct 16 and adapted to be at least partially mounted or positioned in housing 34. Like heater assembly 28, fan 30 may be customized to work with heater 28 to provide optimal performance of heating and cooling device 12. In the illustrated embodiment of FIGS. 2 and 3, fan 30 is a variable, multi-speed circulating rotary fan having a diameter adapted to fill 90 to 95% of the diameter of housing 34. For example, the blades of fan 30 may have a diameter of 5.5 inches when being installed in a six inch round supply duct. Fan 30 may be powered by any standard C-frame motor 32 via shaft 33 and may be of the type sold under model number FP-108CXS1 by Commonwealth, having a place a business at No. 4 Alley 6 Lane 174 HSIN-Ming Rd., Nei-Hu, Taipei, Taiwan R.O.C. (http://www.cic-commonwealth.com.tw). As shown in FIGS. 4 and 6, in another embodiment that will be discussed in more detail below, fan 130 comprises a tube-axial fan.

The fan of the heating and cooling device 12 is adapted to assist in both the heating and cooling of the room. As shown in FIG. 1, fan 30 is positioned or mounted in housing 34 to assist in blowing heated air from both heater 28 and furnace 14 through duct 16 in a direction A toward a supply register 20 in room 22. Similarly, when a cooling unit such as air conditioning unit 14' is connected to duct 16, fan 30 assists in blowing cooled air, at a temperature cooler than the temperature of the room 22, through duct 16. Further, fan 30 is adapted to be activated on its own, i.e., when heater 28, furnace 14 and/or air conditioning unit 14' are all deactivated or when a furnace or air conditioning unit is not included in the system. For example, control 36 may cause fan 30 to automatically operate in "fan only" mode when the temperature detected in the room is higher than the desired temperature set on thermostat 24, to ventilate and increase air circulation in room 22 to assist in cooling room 22 to the desired temperature. Thus, control 36 may automatically activate fan 30 to assist the operation of either a furnace 14 or an air conditioning unit 14', or may activate fan 30 to operate on its own to ventilate room 22 or improve air circulation in room 22.

Control 36 may be any suitable electrical control circuit, such as a circuit board, which may be specially configured or customized to control heating and cooling device 12. As discussed above, control 36 functions to regulate the operation or the activation and deactivation of heater 28 and fan 30 based on input from thermostat 24, which may comprise any standard thermostat commonly known in the art, such as a 24 V.A.C. heating and/or cooling thermostat. Optionally, and to facilitate installation, a wireless thermostat may be used, such as the T8665A Chronotherm® IV Deluxe Programmable Wireless Thermostat, supplied by Honeywell, having a place of business at 1985 Douglas Drive North, Golden Valley, Minn. 55422 (www.honeywell.com/yourhome). Control 36 compares the desired temperature set on thermostat 24 with the actual or current temperature detected in room 22 and activates heater 28 and fan 30 until the desired warmer temperature is reached, and also deactivates the heater when the temperature detected in the room is higher than or equal to the desired temperature, as discussed above. Because the fan assists in both heating and cooling or ventilating room 22, control 36 deactivates fan 30 only when the temperature detected in the room is equal to the desired temperature set on thermostat 24.

Optionally, other thermostats may be used without departing from the spirit and scope of the present invention. For example, a two-stage thermostat may be used which initially activates the heating and cooling device to raise or lower the temperature of a room, and if additional heating or cooling is needed to bring that room to the desired room temperature, the thermostat activates the building's main furnace or air conditioner as needed. Optionally, two or more heating and cooling devices may be installed in different air ducts serving the same room, and controlled by a single thermostat.

Figure 7:
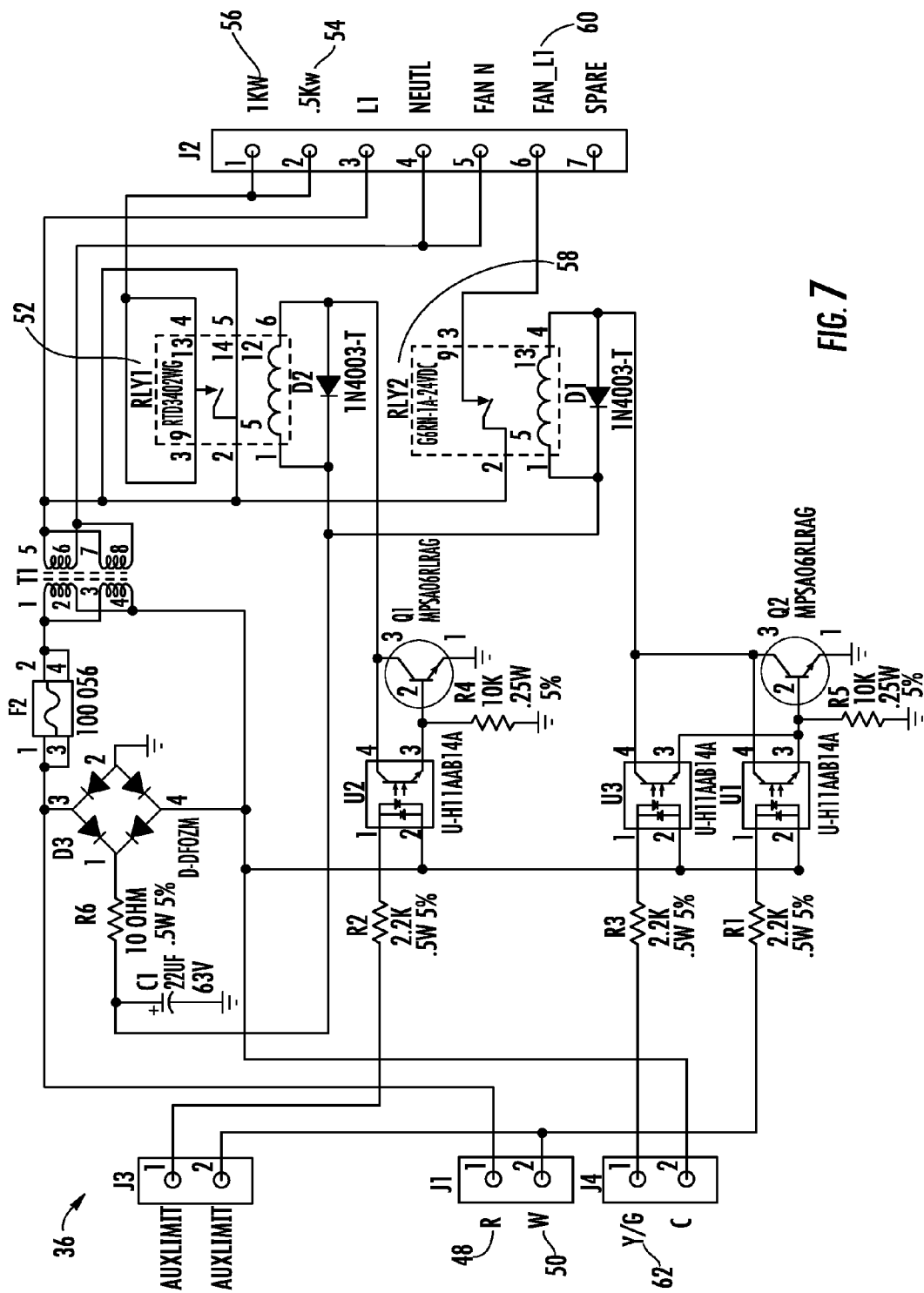
FIG. 7 is a circuit diagram of a circuit adapted to control the heating and cooling device of FIGS. 2-6.

As shown in FIG. 7, which illustrates a circuit diagram of control 36, the action of switching power from R circuit 48 to W circuit 50 will energize relay 1 (designated by numeral 52) to switch power to the 0.5 kw terminal 54 and 1 kw terminal 56 to send power to heater 28, assuming that all three safety limit switches are closed. Such an action would not be permitted if one of the safety limit switches is open. Simultaneously, while R circuit 48 and W circuit 50 are closed, relay 2 (designated by numeral 58) is energized, thus switching power to the fan L1 out terminal 60 to send power to fan 30. Power to fan 30 may also be provided by the action of switching power from R circuit 48 to Y/G circuit 62, which will energize relay 2 (58) to switch power to the fan L1 out terminal 60 to send power to fan 30.

Figure 3:
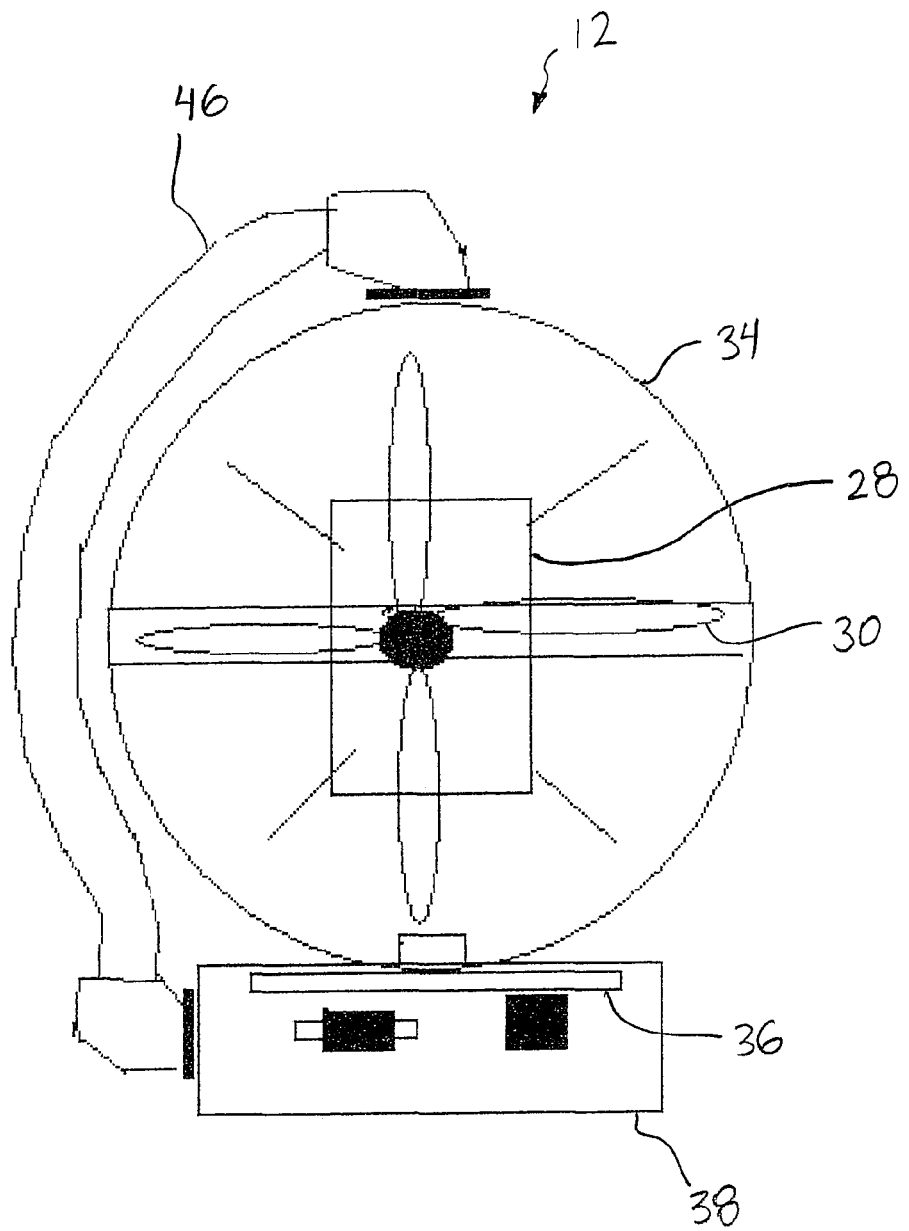
FIG. 3 is a front elevation of the heating and cooling device of FIGS. 1 and 2.

Optionally, a cover or enclosure 38 may be provided to protect the control or circuit board. As shown in FIGS. 2 and 3, control 36 is enclosed or contained within control enclosure 38, which may be part number 50-1289-1, supplied by Magnecraft, having a place of business at 191 Waukegan Rd, Ste. 206, Northfield, Ill. 60093-2743 (http://www.magnecraft.com).

Further, in addition to the two safety devices discussed above, namely, discharge air temperature sensor 40 and safety temperature limit switch 42, heating and cooling device 12 may also include a thermal cut-out or fusible link 44, which, when broken, physically breaks or otherwise interrupts the electric current from control 36 to heater 28 and fan 30. Fusible link 44 may be set to break when the temperature exceeds a selectively chosen limit temperature, which may be approximately 1 to 5 degrees Celsius higher than that of the safety temperature limit switch, such as, for example, approximately 113 degrees Celsius. Fusible link 44 disables heating and cooling device 12 to prevent overheating and a possible fire hazard in the case of circuit board malfunction or failure, for example. When fusible link 44 is broken, heating and cooling device 12 is unable to operate until the broken fusible link has been replaced. Thus, unlike safety temperature limit switch 42, fusible link 44 is not adapted to be automatically reset when heating and cooling device 12 cools to a temperature below the limit temperature. Typically, fusible link 44 is selected to interrupt the electrical current to heater 28 and fan 30 at a temperature approximately 1 to 3 degrees higher than limit switch 42 and operates as an ultimate fail-safe shut off. Fusible link 44 may be supplied by Holmes, Inc., having a place of business at 1605 George Dieter #688, El Paso, Tex. 79936 (http://www.holmesproducts.com).

Optionally, as shown in FIG. 3, heating and cooling device 12 may include a conduit 46 adapted to contain the wiring that electrically connects the electric heater and fan to the control or circuit board. In the illustrated embodiment, conduit 46 is attached or mounted at one end to housing 34 and extends around or about housing 34 to control enclosure 38.

Figure 5:
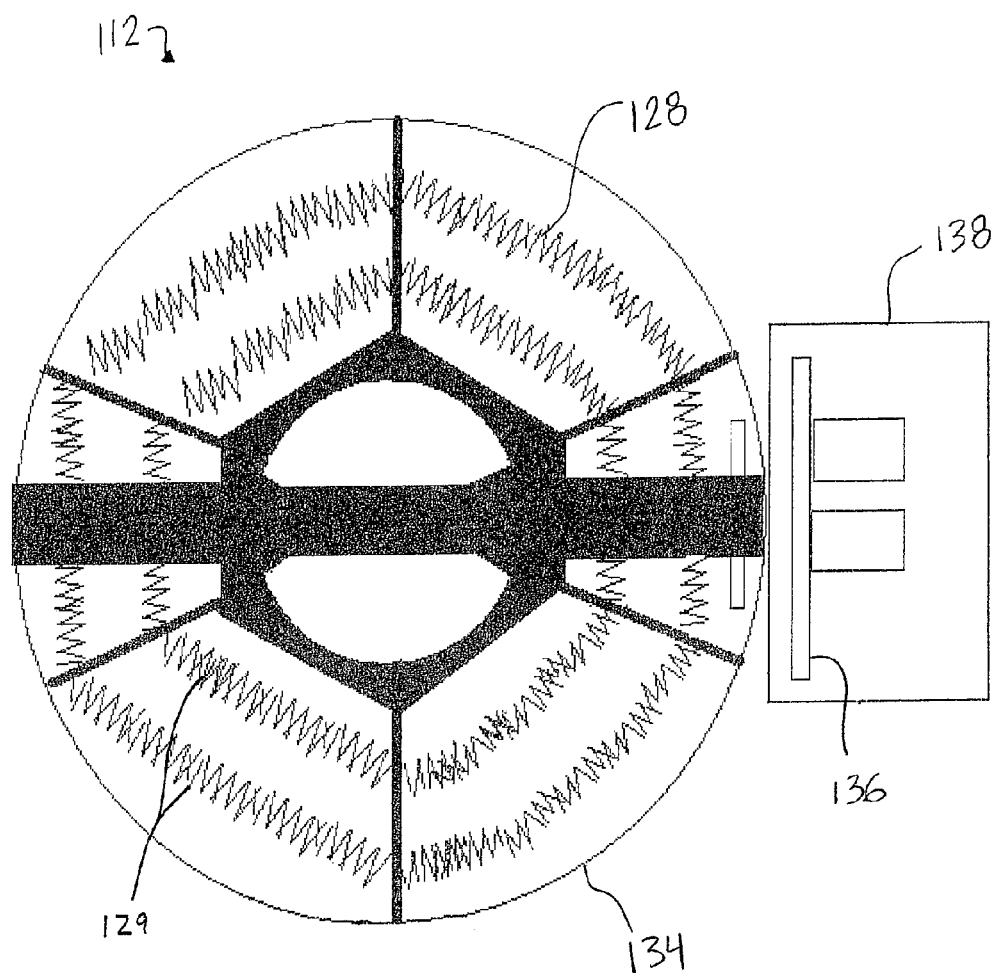
FIG. 5 is a front elevation of the heating and cooling device of FIG. 4.

Alternately, in another embodiment of the invention, the wiring from the heater and the fan may lead directly from the housing into control enclosure 38, such that an external conduit is not required. For example, as shown in FIGS. 4-6, a heating and cooling device 112 includes a housing 134 and a control enclosure 138 that is mounted or attached thereto. Wiring from a heater 128 having electrical resistance coils 129 and a tube-axial fan 130, which are both mounted in the housing, leads directly from housing 134 into control enclosure 138, which houses or contains control 136.

Tube-axial fan 130 is different from fan 30 described above because tube-axial fan 130 is mounted in a tube or cylinder 132 to increase the efficiency of the fan. Heating and cooling device 112 may be otherwise similar to heating and cooling device 12, described above.

Figure 9:
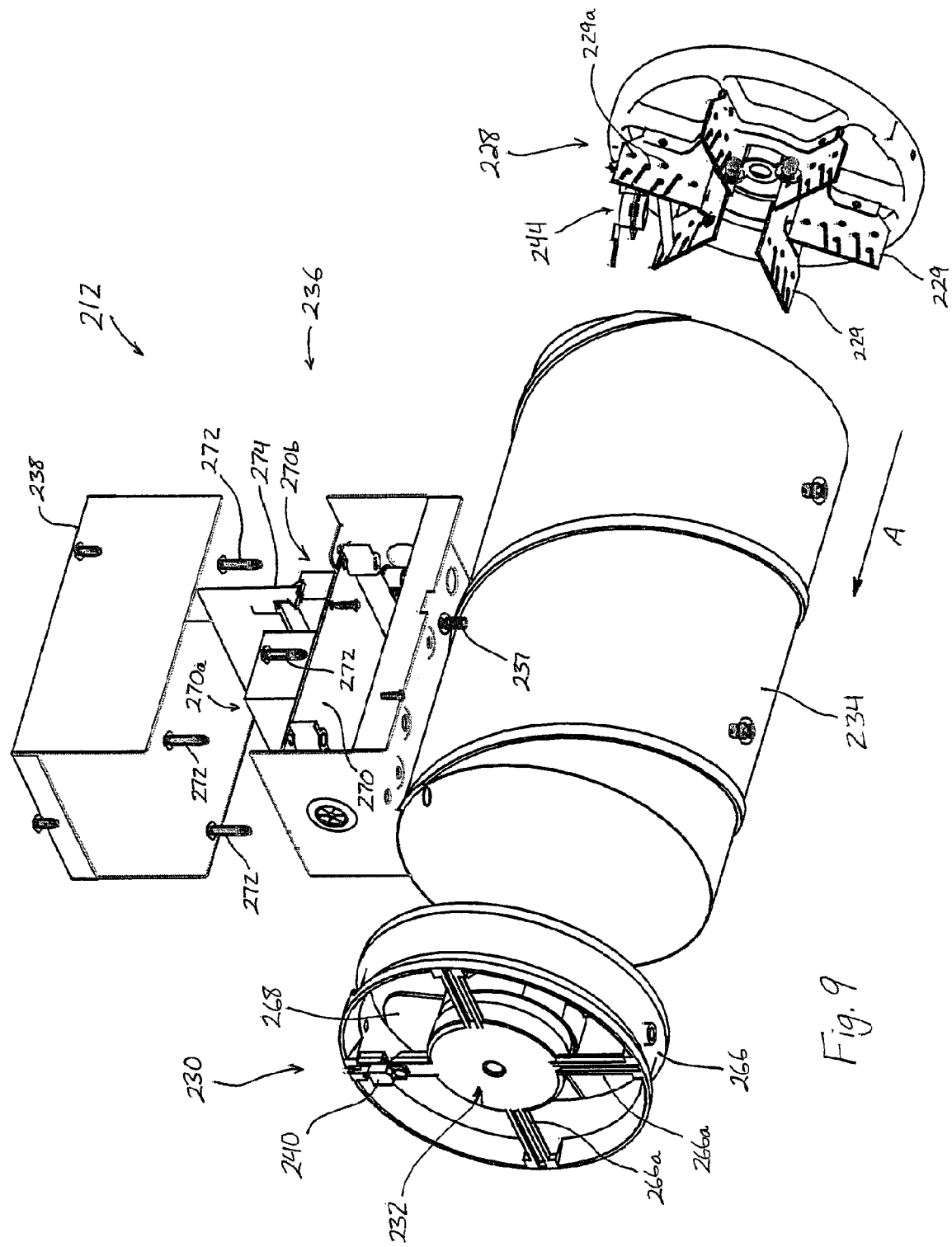
FIG. 9 is a perspective view of another heating and cooling device according to the present invention.
Figure 10:
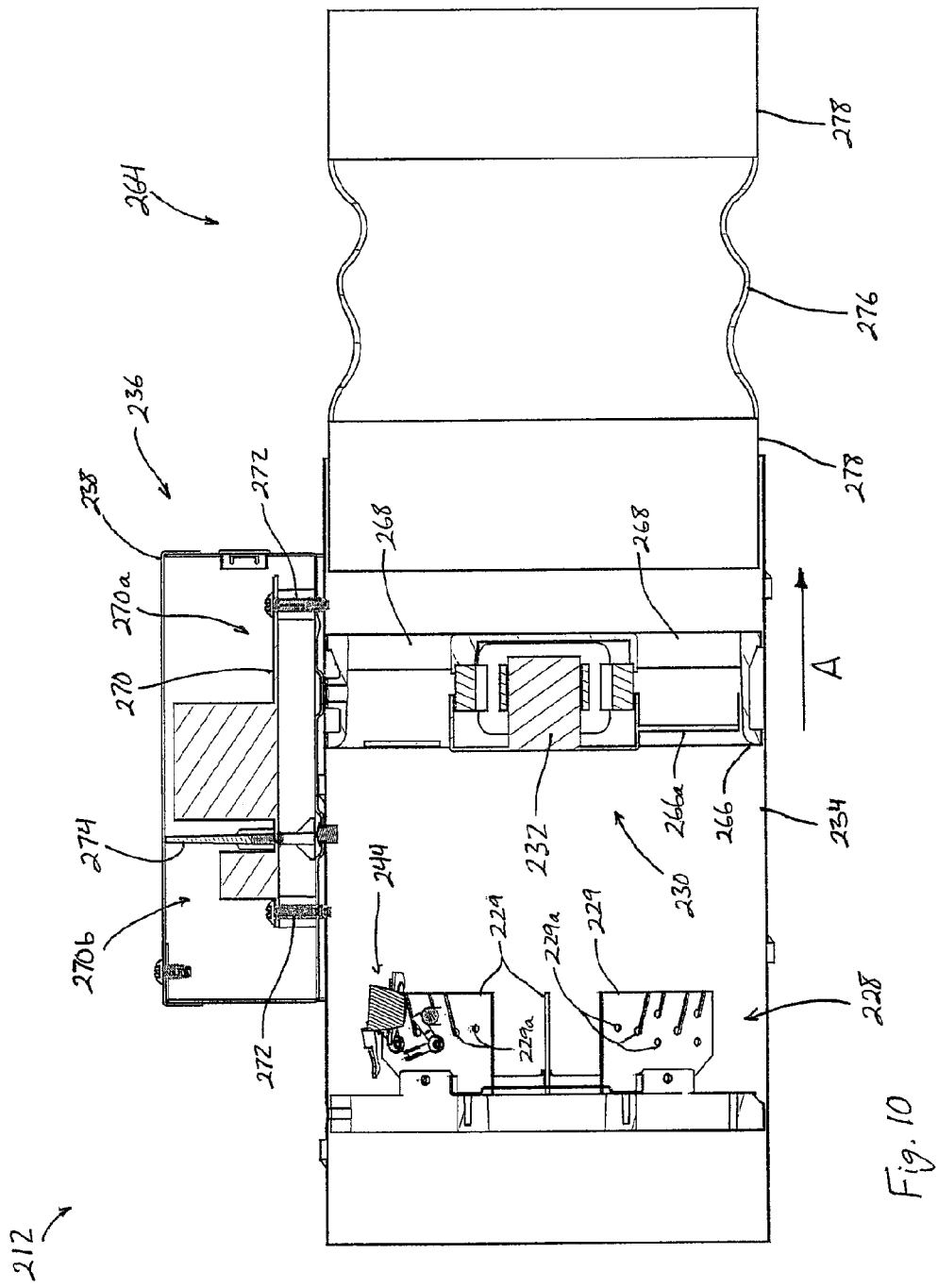
FIG. 10 is a sectional side elevation of the heating and cooling device of FIG. 9, including a vibration insulator sleeve.

Optionally, and with reference to FIGS. 9 and 10, a heating and cooling device 212 is adapted to supplement a traditional or standard furnace or air conditioner and includes a fan unit 230 positioned downstream of a heater unit 228. Fan unit 230 and heater unit 228 are positioned inside a housing 234 and controlled by a controller 236 mounted to an exterior surface of housing 234 via fasteners 237. Optionally, a vibration insulator sleeve 264 (FIG. 10) is coupled to one or both ends of housing 234 to facilitate mounting of device 212 to a duct and to isolate noises produced by device 212.

Fan unit 230 includes an anti-crush ring 266 surrounding fan blades 268 to protect the fan blades from accidental damage or seizing due to improper handling prior to installation of device 212. An electric motor 232 is supported by support members 266a within anti-crush ring 266, and is operable in response to controller 236 to drive fan blades 268. Anti-crush ring 266 may be an aluminum casting or other formed metal member that sufficiently resists accidental compression of the housing 234 in the vicinity of fan unit 230. A discharge air temperature sensor 240 is mounted to one of support members 266a and functions in substantially the same way as air temperature sensor 40, described above. Optionally, other sensors or limiters, such as a safety temperature limit switch and/or a fusible link, such as those described above, may be used to limit or prevent overheating or overvoltage conditions.

Heater unit 228 is positioned upstream of fan unit 230, and may function in substantially the same manner as electric heater 28. Heater unit 228 includes a plurality of radially-arranged and spaced fins or louvers 229 with holes 229a for supporting a plurality of resistance type heating devices or heater wires (not shown in FIGS. 9 and 10, for clarity) that are substantially the same as resistance type heating devices 29, described above, and arranged substantially as shown with reference to coils 129 of FIGS. 4 and 5. By positioning heater unit 228 upstream of fan unit 230, heater unit 228 is exposed to relatively non-turbulent air from the duct, rather than relatively turbulent air from fan blades 268, in order to more uniformly transfer heat from the heater wires to the air that is drawn past the wires by fan unit 230.

A safety temperature limit switch or temperature limit control 244 is positioned on or adjacent one of fins 229 for detecting radiant heat and/or air temperature immediately downstream of the heater wires, and may serve to deactivate the heater wires if the air temperature exceeds a selected limit, such as about 65 degrees Celsius. Temperature limit control 244 may serve substantially the same function and be used in place of fusible link 44 and safety temperature limit switch 42, whereby temperature limit control 244 interrupts the electric current from control 236 to heater unit 228 and/or fan unit 230 when excessive radiant and/or convective heat is detected, such as due to a failed fan unit 230. Temperature limit control 244 may be a fully automatically resettable limit controller that permits resumed operation of device 212 after the temperature detected at control 244 drops to an acceptable level.

Optionally, two or more electrically isolated sets of heating wires are provided to permit selecting a desired heat output of heater unit 228. For example, heater unit 228 may operate with only a relatively low-powered set of heater wires or only a relatively high-powered set of heater wires. The desired heater wires may be selected by installing a jumper or toggling a switch on controller 236. Optionally, both sets of heating wires may be operated simultaneously to maximize the heat output of heater unit 228.

Controller 236 includes an electronic control or circuit board 270 that is mounted to housing 234 and may be electrically isolated therefrom by spacer lugs 272. Circuit board 270 includes a low-voltage side 270a for receiving signals from a thermostat and for handling controller functions, and a high-voltage side 270b for handling the heater and fan power. High-voltage side 270b is separated from low-voltage side 270a by a plate or riser 274 that physically separates the sides to reduce or prevent damage to the low-voltage side 270a caused by accidental electrical contact with the high-voltage side 270b. A cover or enclosure 238 surrounds circuit board 270 and further protects it from outside physical and electrical damage.

Vibration insulator sleeve 264 (FIG. 10) isolates air ducts, such as air duct 16, from vibration and noises generated by heating and cooling device 212 and facilitates installation of device 264 into an air duct. Sleeve 264 includes a hollow cylinder 276 of fabric and a coupling ring 278 on either end of the fabric cylinder 276. Fabric cylinder 276 may be fabricated from a sheet of vinyl or fiberglass fabric coated with silicone, chlorosulfonated polyethylene (such as Hypalon®), or polychloroprene (such as Neoprene), for example, such as a Hardcast® brand flexible duct connectors, available from Carlisle Coatings and Waterproofing Inc., having a place of business at 900 Hensley Lane, Wylie, Tex. 75098 (http://www.hardcast.com). Fabric cylinder 276 is generally compliant and resilient to absorb much of the vibration and noise produced by heating and cooling device 212 and to provide quieter operation, and may be used on either side (i.e., one or both sides) of the device to maximize the sound and vibration isolation. In addition, fabric cylinder 276 is axially compressible to reduce the length or axial dimension of the device 212 when it is equipped with one or more sleeves 264, to facilitate installation and removal of device 212 from an air duct. Fabric cylinder 276 may have sufficient resilience to extend itself axially when compressive loads are released.

Fabric cylinder 276 is formed by rolling the fabric into a cylindrical shape so that two opposed edge portions overlap, and heat-sealing the edge portions together to form a substantially air-tight seam. Coupling rings 278 are joined to the ends of fabric cylinder 276 such as by crimping a portion of each ring onto the fabric, or by gluing, riveting, or the like. When used in conjunction with heating and cooling device 212, one of rings 278 of sleeve 264 may be slid and telescoped into or over housing 234 and fastened or joined to the housing 234 via a rivetless joint, rivets or other fasteners, welding, or the like, and the other ring 278 joined to the air duct in a similar manner.

OPERATION AND METHOD

Figure 8:
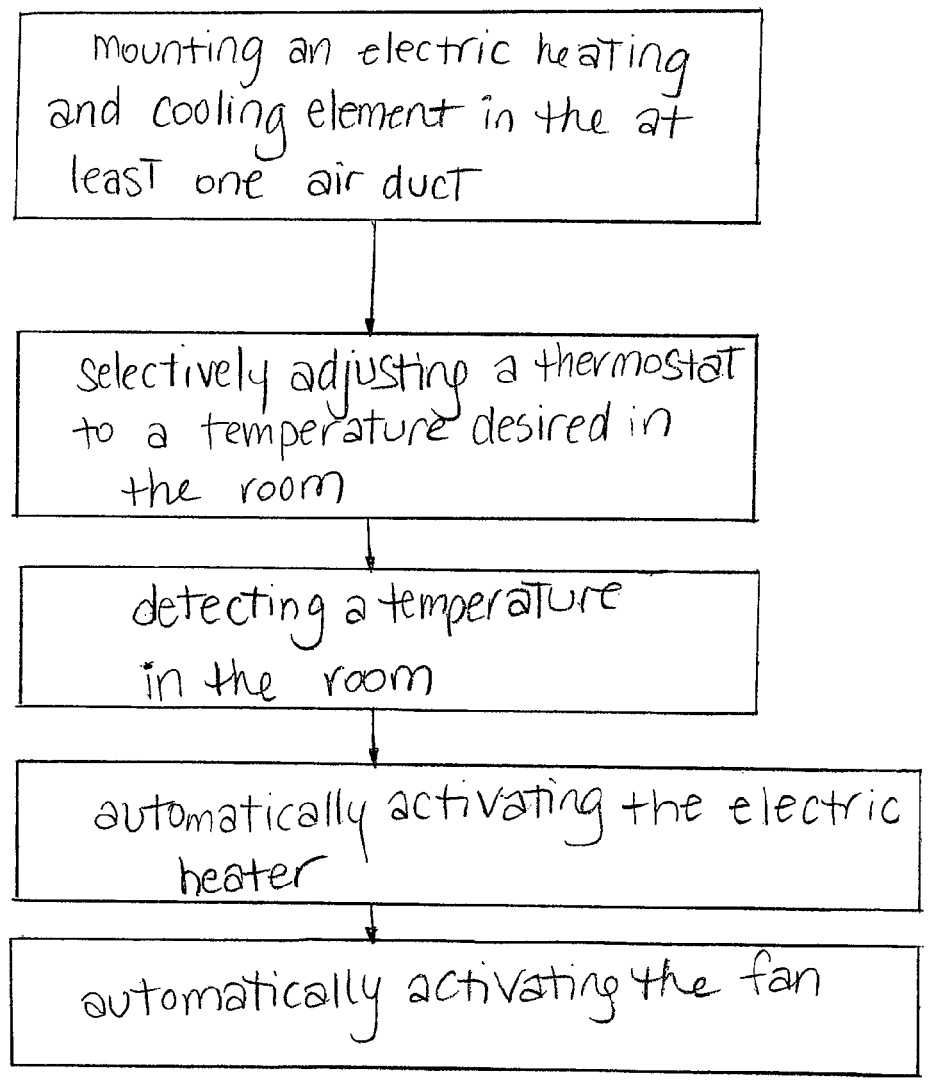
FIG. 8 is a schematic view of a method of heating and cooling a room, according to the present invention.

A method of heating and cooling a room will now be understood from FIG. 8. The room is primarily heated by a furnace 14 connected to at least one forced air duct 16 adapted to transfer heat from the furnace 14 into the room 22. The method includes mounting an electric heating and cooling device 12, 112, 212 in the at least one air duct 16. The electric heating and cooling device includes an electric heater 28, 128, 228, a fan 30, 130, 230, and a housing 34, 134, 234 for containing the electric heater and the fan, as discussed above. The method also includes selectively adjusting a thermostat 24 to a temperature desired in the room and detecting a current or actual temperature in the room.

When heating and cooling device 212 is equipped with one or more sleeves 264, the device 212 may be installed in a gap in an existing air duct by axially compressing fabric cylinder 276 until the outermost rings 278 are positioned in the gap between open ends of the air duct. Device 212 is inserted into the gap, and fabric cylinder 276 is released so that the outermost rings 278 are urged into or over the open ends of the air duct. Rings 278 are then fastened to the air duct and electrical connections are made to controller 236 to complete the installation of the heating and cooling device.

According to the method, electric heater 28, 128, 228 and/or fan 30, 130, 230 operate automatically via control 36 in response to input from thermostat 24 to assist in either heating or cooling the room. For example, the electric heater and the fan are automatically activated when the temperature detected in the room is lower than the desired temperature, to blow heated air generated by the electric heater and the furnace to the room through the air duct. The fan is also automatically activated when the temperature detected in the room is higher than the desired temperature, to blow air through duct 16 to ventilate or increase air circulation through the room. Optionally, when duct 16 is connected to an air conditioning unit, fan 30 may be automatically activated to blow cooled air from the air conditioning unit, which is at a temperature cooler than that of the room, through the air duct to assist in cooling the room. Additionally, fan 30 may draw cooler air from other rooms in the house and the air ducts that feed them, in order to assist in cooling the room.

Further, electric heater 28, 128, 228 may be automatically deactivated when the actual temperature detected in the room is higher than or equal to the desired temperature in the room. Because fan 30, 130, 230 assists in both heating and cooling or ventilating the room, as discussed above, the fan may be automatically deactivated only when the temperature set on the thermostat is equal to the temperature detected in the room.

The method preferably includes the activation of safety mechanisms to prevent overheating of the heating and cooling device and the room to which it is connected. For example, a discharge air temperature sensor may be activated to deactivate electric heater 28, 128, 228 when the temperature of air being discharged from the electric heating and cooling device is higher than a selectively chosen limit temperature, which may be approximately 70 degrees Celsius. Additionally, a safety temperature limit switch may be activated to deactivate the electric heater when the temperature of the electric heater exceeds a selectively chosen limit temperature, such as 111 degrees Celsius. The safety temperature limit switch automatically resets to allow the electric heater to operate when the electric heater cools to a temperature below the designated or chosen temperature.

The method may also include connecting a fusible link in the electrical circuit to interrupt the electric current from the control to the electric heater and the fan when the electric heating and cooling device exceeds a selectively chosen limit temperature, which may be approximately 113 degrees Celsius. Once the fusible link is broken, the heating and cooling device is unable to operate. Accordingly, the method may include replacing the fusible link to again operate the electric heating and cooling device.

When heating and cooling device 212 is equipped with one or more sleeves 264, the device 212 may be installed in a gap in an existing air duct by axially compressing fabric cylinder 276 until the outermost rings 278 are positioned in the gap between open ends of the air duct. Device 212 is inserted into the gap, and fabric cylinder 276 is released so that the outermost rings 278 are urged into or over the open ends of the air duct. Rings 278 are then fastened to the air duct and electrical connections are made to controller 236 to complete the installation of the heating and cooling device.

Thus, the embodiments presented herein provide an electric heating and cooling device adapted to supplement a home's traditional heating and/or cooling system. The device provides supplemental heated air to a room that is difficult to heat and is adapted to assist an air conditioning unit in providing cooled air to a room that is typically warmer than the rest of the rooms in a building. Further, the device is adapted to operate in "fan only" mode to ventilate a room when the temperature in the room is warmer than desired. Installation of the device is simplified in that the device is adapted to be mounted in the existing duct work of a home, such that additional ducts are not required. In addition, the device includes three separate safety devices to prevent overheating.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A method of heating and cooling a room that is primarily heated by a furnace adapted to supply heat to the room through an air duct, and that is primarily cooled by a cooling unit adapted to supply cooled air to the room through the air duct, said method comprising:
    directing substantially all of the air from the air duct into a fluid passageway defined by a housing of a heating and cooling device that is positioned in-line with the air duct, the housing containing a heater and a fan disposed in the fluid passageway, whereby substantially all of the air in the fluid passageway is received from the air duct and is directed through the heater and the fan;
    controlling the heater and the fan of the heating and cooling device with a controller that is in communication with a thermostat positioned in the room;
    selecting a desired temperature in the room at the thermostat;
    automatically activating the heater with the controller when the temperature detected in the room by the thermostat is lower than a threshold minimum temperature corresponding to the selected desired temperature;
    automatically activating the fan with the controller when the temperature detected in the room is lower than the threshold minimum temperature;
    supplementing the cooling unit associated with the air duct by activating the fan, without activating the heater, to draw air previously cooled by the cooling unit through the air duct with the fan when a temperature in the room is higher than a desired maximum temperature, thereby supplementing the cooling unit associated with the air duct; and
    discharging substantially all of the air in the fluid passageway of the heating and cooling device into the room.

2. The method of claim 1, further comprising automatically deactivating the heater when the temperature detected in the room is approximately equal to the desired temperature.

3. The method of claim 1, further comprising automatically deactivating the fan when the temperature detected in the room is approximately equal to the desired temperature.

4. The method of claim 1, wherein said automatically activating the fan and said automatically activating the heater comprises selectively activating the heater and the fan with a wireless thermostat that is in wireless communication with the controller.

5. The method of claim 1, further comprising positioning the heating and cooling device in-line with the air duct by coupling a vibration insulator sleeve, which includes a hollow fabric member, between the housing and the air duct.

6. The method of claim 1, wherein said activating the fan without activating the heater comprises generating a fan-activation signal at the thermostat and receiving the fan-activation signal at the controller.

7. A method of heating and cooling a room that is primarily heated by a furnace adapted to supply heat to the room through an air duct, and that is primarily cooled by a cooling unit adapted to supply cooled air to the room through the air duct, said method comprising:
    mounting an electric heating and cooling device in-line with the air duct, the electric heating and cooling device including a heater and a fan disposed in a fluid passageway defined by a housing that is coupled to the air duct;
    directing heated or cooled air, from the furnace or the cooling unit, through the air duct so that substantially all air passing from the furnace or the cooling unit through the air duct is directed through the fluid passageway, the heater, and the fan, so that substantially all of the air passing through the electric heating and cooling device is received from only the air duct regardless of whether either of the fan or the heater is operating;
    adjusting a thermostat that is in communication with the heating and cooling device to select a desired temperature in the room;
    detecting a temperature in the room with the thermostat;
    automatically activating the heater and the fan when the temperature detected in the room is lower than the desired temperature, to propel heated air generated by the furnace and the heater to the room through the air duct; and
    activating the fan in response to a fan-activation signal, without activating the heater, to propel air through the air duct that was previously cooled by the cooling unit and is at a cooler temperature than the temperature detected in the room by the thermostat, thereby supplementing the cooling unit associated with the air duct.

8. The method of claim 7, further comprising automatically deactivating the heater when the temperature detected in the room is higher than or equal to the desired temperature.

9. The method of claim 7, further comprising automatically deactivating the fan when the temperature detected in the room is substantially equal to the desired temperature.

10. The method of claim 7, further comprising selectively activating the heater and the fan with a wireless thermostat that is in wireless communication with a controller.

11. The method of claim 7, further comprising:
    detecting a temperature of air discharged from the heating and cooling device with a discharge air temperature sensor mounted at the housing; and
    automatically deactivating the heater when the discharge air temperature sensor detects that the temperature of the air discharged from the heating and cooling device is higher than a selectively chosen limit temperature.

12. The method of claim 7, wherein said mounting the heating and cooling device in-line with the air duct comprises coupling a vibration insulator sleeve, including a hollow fabric member, between the housing and the air duct.

13. The method of claim 7, wherein said activating the fan without activating the heater comprises generating the fan-activation signal at the thermostat and receiving the fan-activation signal at a controller.

14. A method of heating and cooling a room that is primarily heated by a furnace adapted to supply heat to the room through an air duct, and that is primarily cooled by a cooling unit adapted to supply cooled air to the room through the air duct, said method comprising:
    positioning an electric heating and cooling device in-line with the air duct, the electric heating and cooling device including an electric heater and an electric fan disposed in a fluid passageway defined by a housing;
    directing substantially all of the air passing from the furnace or the cooling unit through the air duct through the fluid passageway, the electric heater, and the electric fan;
    selectively adjusting a thermostat that is in communication with the heating and cooling device to a temperature desired in the room;
    detecting a temperature in the room with the thermostat;
    automatically activating the electric heater and the electric fan when the temperature detected in the room is detected by the thermostat as being lower than a threshold minimum temperature corresponding to the desired temperature;
    activating the electric fan in response to a fan-activation signal, without activating the electric heater, to propel air through the air duct that was previously cooled by the cooling unit and is at a cooler temperature than the temperature in the room, to thereby supplement the cooling unit associated with the air duct; and discharging substantially all of the air in the fluid passageway of the heating and cooling device into the room.

15. The method of claim 14, further comprising automatically deactivating the electric heater when the temperature detected in the room is higher than or substantially equal to the desired temperature.

16. The method of claim 14, further comprising automatically deactivating the electric fan when the temperature detected in the room is substantially equal to the desired temperature.

17. The method of claim 14, further comprising selectively activating the electric heater and the electric fan with a wireless thermostat that is in wireless communication with the electric heating and cooling device.

18. The method of claim 17, further comprising selectively activating the electric heater and the electric fan with a controller that is in wireless communication with the wireless thermostat.

19. The method of claim 14, wherein said positioning an electric heating and cooling device in-line with the air duct comprises coupling a vibration insulator sleeve, including a hollow fabric member, between the housing and the air duct.

20. The method of claim 14, wherein said activating the electric fan without activating the electric heater comprises generating the fan-activation signal at the thermostat and receiving the fan-activation signal at a controller.

\* \* \* \* \*